United States Patent
von und zu Liechtenstein et al.

(10) Patent No.: US 12,342,855 B2
(45) Date of Patent: *Jul. 1, 2025

(54) REMOTE MONITORING OF PERISHABLE TRADE ITEMS IN ENVIRONMENTALLY-CONTROLLED STORAGE CONTAINERS

(71) Applicant: Samsung Electronics Co., Ltd., Suwon-si (KR)

(72) Inventors: Maximilian Ralph Peter von und zu Liechtenstein, Douglas (IM); Erich Linus Birchler, Bottighofen (CH)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,376

(22) Filed: Apr. 4, 2024

(65) Prior Publication Data

US 2024/0315325 A1    Sep. 26, 2024

Related U.S. Application Data

(63) Continuation of application No. 17/334,690, filed on May 29, 2021, now Pat. No. 11,963,549, which is a
(Continued)

(51) Int. Cl.
| | |
|---|---|
| *A24F 25/00* | (2006.01) |
| *B65D 85/12* | (2006.01) |
| *F25D 21/00* | (2006.01) |
| *G05B 23/02* | (2006.01) |
| *G07C 3/02* | (2006.01) |
| *H04L 67/1095* | (2022.01) |
| *H04W 4/35* | (2018.01) |

(52) U.S. Cl.
CPC .............. *A24F 25/00* (2013.01); *B65D 85/12* (2013.01); *F25D 21/006* (2013.01); *G05B 23/0259* (2013.01); *G07C 3/02* (2013.01); *H04L 67/1095* (2013.01); *H04W 4/35* (2018.02)

(58) Field of Classification Search
CPC .......... H04W 4/35; A24F 25/00; B65D 85/12; F25D 21/006; G05B 23/025; G07C 3/00; H04L 67/1095
See application file for complete search history.

(56) References Cited

U.S. PATENT DOCUMENTS

| | | | |
|---|---|---|---|
| 8,747,775 B2 * | 6/2014 | Sandvick | ............... B65D 79/02 426/87 |
| 10,939,260 B1 * | 3/2021 | von und zu Liechtenstein | ........... F25D 21/006 |

(Continued)

*Primary Examiner* — Kashif Siddiqui
(74) *Attorney, Agent, or Firm* — Jefferson IP Law, LLP

(57) ABSTRACT

An apparatus is described herein related to remote monitoring of perishable trade items in environmentally-controlled storage containers. Relevant changes in the container environment are detected through various sensors-based event detectors. A timer serves to trigger a plurality of distinct alert states, comprising pre-alerts and full alerts, following an event-initiated time threshold expiry. A data repository of generic merchandise data is accessed in order to derive suitable timer pre-sets in relation to time thresholds for alert states. An account configuration engine serves to customize the threshold presets to the specific items stored inside the container.

18 Claims, 10 Drawing Sheets

Related U.S. Application Data continuation of application No. 17/187,888, filed on Mar. 1, 2021, now Pat. No. 11,033,052, which is a continuation of application No. 17/031,978, filed on Sep. 25, 2020, now Pat. No. 10,939,260, which is a continuation of application No. 15/275,506, filed on Sep. 26, 2016, now Pat. No. 10,806,177.

(56) References Cited

U.S. PATENT DOCUMENTS

| | | | |
|---|---|---|---|
| 11,033,052 B1* | 6/2021 | von und zu Liechtenstein | H04L 67/1095 |
| 11,963,549 B2* | 4/2024 | von und zu Liechtenstein | F25D 21/006 |
| 2016/0162715 A1* | 6/2016 | Luk | F25D 29/00 235/385 |
| 2016/0232877 A1* | 8/2016 | Cho | F25D 29/00 |
| 2017/0219279 A1* | 8/2017 | Chae | G01K 1/024 |
| 2018/0093814 A1* | 4/2018 | Espinosa | A23L 3/28 |
| 2018/0239319 A1* | 8/2018 | Abdoo | G05B 15/02 |
| 2019/0387375 A1* | 12/2019 | Gao | G06Q 10/087 |
| 2020/0027056 A1* | 1/2020 | Corona | G06F 18/24 |
| 2020/0065353 A1* | 2/2020 | Mehring | G06K 19/0723 |
| 2020/0097776 A1* | 3/2020 | Kim | G06T 7/70 |

\* cited by examiner

REMOTE MONITORING OF PERISHABLE TRADE ITEMS IN ENVIRONMENTALLY-CONTROLLED STORAGE CONTAINERS

CROSS REFERENCE TO RELATED APPLICATIONS

This application is a continuation of the following U.S. patent application, which is incorporated by reference in its entirety:
U.S. Non-Provisional application Ser. No. U.S. Ser. No. 17/334,690, filed May 29, 2021,
which is a continuation of the following U.S. patent application, which is incorporated by reference in its entirety:
U.S. Non-Provisional application Ser. No. U.S. Ser. No. 17/187,888, filed Mar. 1, 2021,
which is a continuation of the following U.S. patent application, which is incorporated by reference in its entirety:
U.S. Non-Provisional application Ser. No. U.S. Ser. No. 17/031,978, filed Sep. 25, 2020,
which is a continuation of the following U.S. patent application, which is incorporated by reference in its entirety:
U.S. Non-Provisional application Ser. No. U.S. Ser. No. 15/275,506, filed Sep. 26, 2016.

STATEMENT REGARDING FEDERALLY SPONSORED RESEARCH OR DEVELOPMENT

Not applicable to this application.

FIELD OF THE INVENTION

The document relates to systems, devices, methods, and related computer program products for environmental monitoring.

BACKGROUND OF THE INVENTION

Prior Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

The ideal storage conditions for a cigar are approximately 70 percent humidity at 68 degrees Fahrenheit. Air at different temperatures will hold completely different amounts of moisture. The best way to store cigars is in a humidor. The purpose of a humidor is to recreate the mild, humid climate of the Caribbean, where the cigars are made. Every humidor contains some kind of humidifying element. A humidor can also be used to age cigars. While aging, cigars of the same brand should be kept together, without the cellophane, in a cedar-lined humidor. The benefit of this is to draw out any excessive moisture and allow the cigars to "marry." Marriage is when the cigars absorb each other's oils and create one unique flavor. The cedar will also add to the flavor of the cigars. In regular intervals the humidor needs to be opened for a few hours to let the air hit the cigars or they will acquire a musty taste.

With the advent of environmental monitoring technology, electronic sensors have been introduced to humidors, which allow users to continuously monitor parameters such as relative humidity. Since the Internet-of-Things revolution, many of these sensors allow remote monitoring over the Internet. It is also possible that that an alert is triggered whenever a set upper or lower limit on an environmental parameter is breached.

U.S. Pat. No. 6,157,306 issued to Marco Mularoni on Dec. 5, 2000 discloses a humidity sensing device dimensioned to be received in a humidor for detecting an out of range ambient moisture condition and transmitting a signal to a remote monitor.

U.S. patent application Ser. No. 14/761,673 filed on Feb. 19, 2014 by Bernd Abel et al. discloses a device for influencing the room climate. The application discloses open window detection methods accomplished either by window contacts or, alternatively, by a drop in room temperature in a pre-defined interval of time.

U.S. patent application Ser. No. 14/617,619 filed on Feb. 9, 2015 by David Sloo et al. discloses a smart hazard detector providing follow up communications to detection events.

U.S. patent application Ser. No. 13/867,775 filed on Apr. 22, 2013 by Ashok Sabata et al. discloses a solution for wirelessly monitoring environmental parameters with smartphones and tablets.

SUMMARY

The present invention recognizes that it is desirable to alert a stakeholder not only to the presence of a certain environmental condition, but also to the prolonged absence of one. Thus it may also be the time period denoting the absence of an environmental condition or the time period since a particular environmental event which may be of interest. In the context of a cigar humidor it is of particular interest what time has elapsed since the last airing out of the humidor. This is because certain embodiments of the present invention feature a function that alerts a stakeholder whenever a humidor has not been aired out within a prescribed interval.

The present invention solves the problem of detecting airing out events in various embodiments. In the simplest embodiment an operator presses a notification button whenever a humidor has been aired out. In another embodiment the signal from a door contact is used to automatically detect an airing event. In a preferred embodiment changes in environmental parameters such as humidity and temperature are analyzed by a plurality of processors in order to look for certain signature changes which are suitable for detecting an airing event.

The present invention, in part, solves the problem of how to detect an airing event from a time series of measured environmental parameters by applying mathematical methods centered on time series anomaly discovery. Whereas the prior art is restricted to crude estimates of sudden gradient increase in temperature, the present invention has been implemented in a preferred embodiment by time series anomaly discovery with grammar based compression. However, the present invention may also be practiced with alternative methods of time series anomaly discovery.

The present invention also solves the problem of contamination of the air inside a humidor by fumes given off by the sensor device itself, by using stainless steel, anodized aluminum, polished brass or wood as a suitable material for the casing of any components placed directly inside the humidor. The invention may also be practiced with other materials for the casing, as long as it is assured that the material is incapable of releasing fumes or smells. In a preferred embodiment of the invention the sensor casing is made from materials comprising wood of the type Spanish Cedar. By encasing the sensor in Spanish Cedar wood a number of important advantages may be gained, namely: a positive effect on cigar flavor, protection from tobacco beetles and regulation of humidity and temperature. It has to be noted that Spanish Cedar wood is by far the most effective wood type for regulating temperature and humidity levels in a humidor. After Spanish Cedar, American Red Cedar is another suitable type of wood for use in the said sensor casing. One of the downsides associated with American Red Cedar is that over time the cigars stored in the humidor may develop a somewhat "woody" flavor, which is not desired.

Another embodiment of the sensor casing uses wood of the type Honduran Mahogany. The humidity absorption rate for Honduran Mahogany is similar to that of Spanish Cedar, and it does not have an intense odor like American Red Cedar wood. However, it is not as strong a deterrent on tobacco beetles and worms as Spanish cedar, and does not help maintain flavor as good either.

The present invention furthermore solves the problem of having to place the sensor device as close to the merchandise stored in the humidor as possible, whilst at the same time being economic on space requirements, by using a shape for the sensor casing that is adapted from the shape and size of the merchandise. In other words, in the context of a humidor for cigars the present invention does favor the approximate shape of a cigar as the preferred shape for the sensor casing.

There has thus been outlined, rather broadly, some of the features of the disclosed humidor monitoring technique in order that the detailed description thereof may be better understood, and in order that the present contribution to the art may be better appreciated. There are additional features of the humidor monitoring technique that will be described hereinafter and that will form the subject matter of the claims appended hereto. In this respect, before explaining at least one embodiment of the humidor monitoring technique in detail, it is to be understood that the humidor monitoring technique is not limited in its application to the details of construction or to the arrangements of the components set forth in the following description or illustrated in the drawings. The humidor monitoring technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1A:
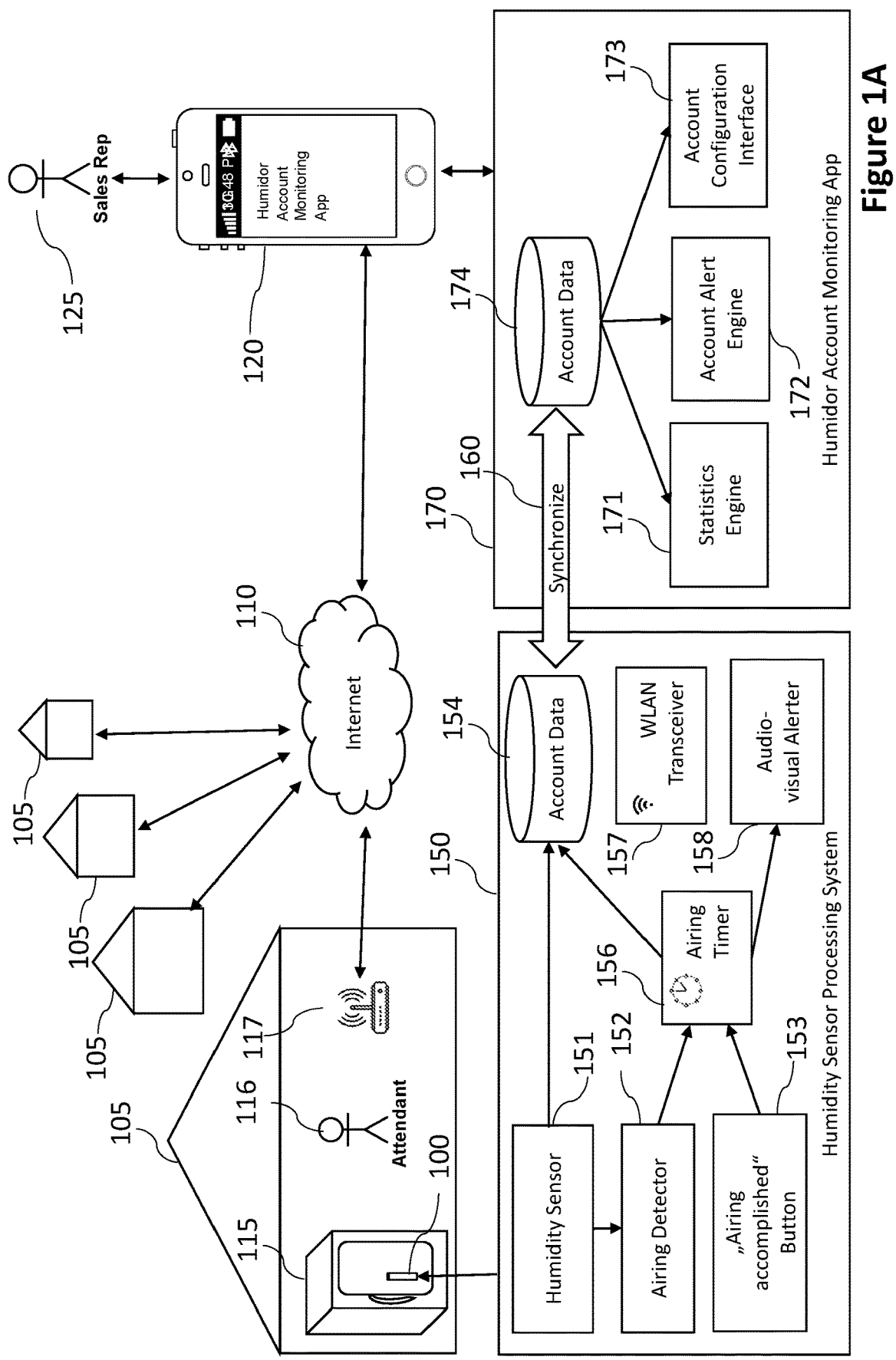
FIG. 1A illustrates the overall system architecture of a distributed humidor monitoring system, according to an example embodiment.

Conventional sensors deployed in cigar humidors tend to log a number of environmental parameters, most importantly relative humidity, and alert the user to a preset threshold being breached on any of these parameters. Rather than having a humidor monitoring system dispatching an alert only on breach of a threshold of an environmental parameter, embodiments detailed herein describe a monitoring system wherein detection of an environmental event sets off a timer and an alert is being processed at the expiry of the timer interval. Alternative methods of setting off the timer are described hereinafter. In the simplest embodiment a user notifies the system of an event through a user interface. Such notification may be effected by pressing a button on the sensor, or by making such notification via smartphone app, for example. Alternatively, in other embodiments, the timer may be set off by monitoring for a "door open" state, wherein when the humidor door has been detected to have been open for a length of time exceeding a threshold, the timer is started. In a preferred embodiment the timer is started whenever environmental parameters measured inside the humidor indicate an airing event. In particular, relative humidity has been found by the present inventors to be a parameter which is especially suitable for estimating the occurrence of an airing event. Other parameters or a combination of parameters are possible also. In the preferred embodiment an airing event is detected by configuring a processor to analyze a time series of measurements of relative humidity in real time. In order to detect an airing event outliers in the humidity curve are being detected using a suitable algorithm for time series anomaly discovery. An outlier is defined as an observation which appears to be inconsistent with the rest of the data. So the outlier is an atypical data not matching the pattern suggested by the majority of observations. The problem of anomaly detection in time series has been approached in various ways. However, most techniques require the user to provide the length of a potential anomaly, which is impractical in the setting of the present invention, whereby it is precisely the length of the anomaly which is a prime interest when detecting an airing event. Many of these algorithms are built upon costly distance functions which may account for around 90 percent of the algorithm's computation time. Because of these considerations the present inventors have elected to implement time series anomaly discovery with grammar-based compression. A preferred embodiment of the present invention uses an algorithm published by Senin et. al. That algorithm discretizes continuous time series values into symbolic form, infers a context-free grammar, and exploits its hierarchical structure to effectively and efficiently discover algorithmic irregularities that are related to anomalies. The approach taken is based on the general principle of Kolmogorov complexity where the randomness in a sequence is a function of its algorithmic incompressibility. A preferred embodiment of the present invention was implemented with Grammar Viz 3.0, an open source Java tool for time series pattern mining. The GrammarViz approach for time series pattern discovery is based on two algorithms that have linear time and space complexity, namely Symbolic Aggregate Approximation (SAX) that discretizes the input time series into a string, and Sequitur, that induces a context-free grammar from it. By exploiting the hierarchical structure of the context-free grammar, GrammarViz is able to identify rare and frequent grammar rules in real time, i.e. along with the signal acquisition.

FIG. 1 illustrates an embodiment of a distributed humidor monitoring system comprising a humidor sensor processing system, which in turn comprises the innovative airing detection technology alongside the corresponding airing timer. The figure depicts a cigar humidor 115, containing an instance of a Humidor Sensor Processing System (HSPS) 100. The humidor is situated in a building 105, such as a shop in a commercial setting, or a residential house in a private setting. The building contains a plurality of at least one Internet router 117 which is wirelessly networked with the HSPS 100. Furthermore there is an attendant 116, a person who is regularly in the same building as the humidor. It is the said attendant who would normally carry out the regular airing out operations which are so crucial for maintaining the correct environmental conditions for long-term storage of high-end cigars. In some embodiments the said attendant would also be tasked to notify the system either by pressing a button on the HSPS casing or by using a smartphone app, whenever he or she has carried out an airing out operation. In other more advanced embodiments the system would detect such airing out operations automatically. The figure further depicts another stakeholder, namely a sales rep 125. The sales rep is a stakeholder who has an interest that the environmental conditions inside cigar humidors in a plurality of associated shops 105 are always at an optimum. The sales rep 125 keeps track of the said plurality of humidors by being assisted by an application typically hosted on a smartphone 120. However it is possible to host the Humidor Account Monitoring App (HAMA) 170 on any other suitable computing device, such as a tablet computer, a notebook computer or a desktop computer. The said HAMA app is connected via a remote network to the plurality of HSPS. Usually the Internet 110 is used to provide the required connectivity. The HSPS component 150 is comprised in the depicted embodiment of a humidity sensor 151, an airing detector 152, an "airing accomplished" button 153, an airing timer 156, a wireless local area network transceiver 157 and an audio-visual alerter 158. Furthermore the HSPS comprises its own data storage capability 154 for account data in the form of a suitable read/write persistent memory component, such as flash memory or a hard drive.

The humidity sensor 151, may be realized as any commonly available electronic component capable of taking a measurement of relative humidity. In a preferred embodiment the Honeywell HIH4000-001 Humidity Sensor (3-Pin SIP) was utilized. The airing detector 152 represents any component which is capable of determining if and when an airing-out event has taken place. In a preferred embodiment the airing-out events are detected by using an algorithm capable of detecting outliers in a time series of measurements of relative humidity. Other ways of automatically detecting an airing-out event are also possible. The "airing accomplished" button 153, serves a similar purpose as the airing detector, wherein the airing-out event is detected by explicit notification through a human person, as opposed to automatic detection. In this way whenever an operator of a cigar humidor, for example, is airing out the humidor, the operator has the option of pressing a button on the HSPS which serves as notification that the humidor has been aired out successfully. There are other possibilities of accomplishing the same goal, other than pressing a button. Operating a smartphone app with an inbuilt notification function would be an example of an alternative embodiment. Both the airing detector 152 and the "airing accomplished" button 153 serve the purpose of triggering the airing timer 156. The purpose of the airing timer is to keep track of how much time has passed since the last airing-out event. The airing timer 156 is configured with a time limit, after which another airing of the humidor is due. The said time limit may be dynamically re-configured in order to account for different merchandise having different airing schedules. Once the pre-configured time period since the last airing event has elapsed, then a localized audio-visual alert 158 may be output by the HSPS. The audio-visual alert may take the form of a blinking light, a buzzer, or any other form suitable of making an operator of the humidor aware of that fact that the humidor needs airing out. In a preferred embodiment the audio-visual alerter 158 takes the form of a slowly flashing light-emitting diode (LED). In order to allow remote monitoring the HSPS needs to be connected to a remote network. For that purpose the HSPS is equipped with a wireless local area network (WLAN) transceiver 157 which in turn allows access to the Internet via a router 117. Other suitable methods of connecting wirelessly to a remote network may be used in alternative embodiments. In particular it is possible that the Internet may be accessed directly by the HSPS without a requirement to route through a local area network as an intermediate step. The HSPS comprises its own data storage 154. The data storage 154 is used mainly for account data. Each site 105 comprising a plurality of humidors is mapped to a humidor account in a preferred embodiment. It is the account specific data that is persistently stored and buffered in the account data component 154. The account data 154 comprises a repository of data derived from environmental sensors, as well as an event log and parameter data. The parameter data comprises configuration data, such as presets for the timeouts in relation to the airing timer. It is important that such timeouts are individually configurable per account because different brands of merchandise tend to have different environmental requirements including airing specifications. The HSPS 150 can placed into a cigar humidor. In a preferred embodiment the HSPS is shaped and sized in a similar fashion as a cigar. By selecting this shape and size the present inventors found that this enables easy placement of the HSPS in virtually any humidor rack designed to hold cigars. By placing the HSPS in a rack designed for cigars yields another important advantage, namely that the HSPS can take measurements of environmental data in the closest physical proximity possible to the merchandise subject to environmental monitoring. Since the invention can be practiced in other embodiments the same principle would apply to the measurement of environmental parameters for merchandise other than cigars. For example if the environmental conditions were to be monitored with regards to the storage of eggs in an egg container comprising a plurality of racks designed to hold eggs, then the optimal size and shape for an HSPS casing would be that of an egg. If the HSPS were to be mounted at a place more distant to the actual merchandise, then the measurements taken would run the risk that the environmental conditions in the storage container are not identical at all places inside the container, i.e. that the conditions are marginally different in the direct vicinity of the merchandise than they are at other points in the container.

The Humidor Account Monitoring App (HAMA) 170 which is hosted on a smartphone-type device comprises account data 174 relating to a plurality of humidor accounts. The said account data 174 is synchronized with related account data hosted by the plurality of HSPS in regular intervals. The monitoring app 170 uses the account data 174 as input for the statistics engine 171. The statistical analysis performed by the statistics engine 171 primarily in order to gain business intelligence related to environmental monitoring of cigar humidors. The account data 174 also feeds the account alert engine 172, which is utilized for alerting a stakeholder, most commonly a sales representative 125, to an actionable environmental condition. In the context of the described use case it is the absence an airing event over a prescribed period of time which is an example of such an actionable environmental condition. Other examples would be the temperature or the humidity deviating from a pre-defined target band. The account data 174 also comprises data gathered from the account configuration interface 173. The account configuration engine 173 related primarily to entering and storing master data relating to humidor accounts as well as account configuration data, such as alert preferences. The respective repositories of account data on the HSPS and the HAMA are subject to regular synchronization 160 over the Internet 170.

Figure 1B:
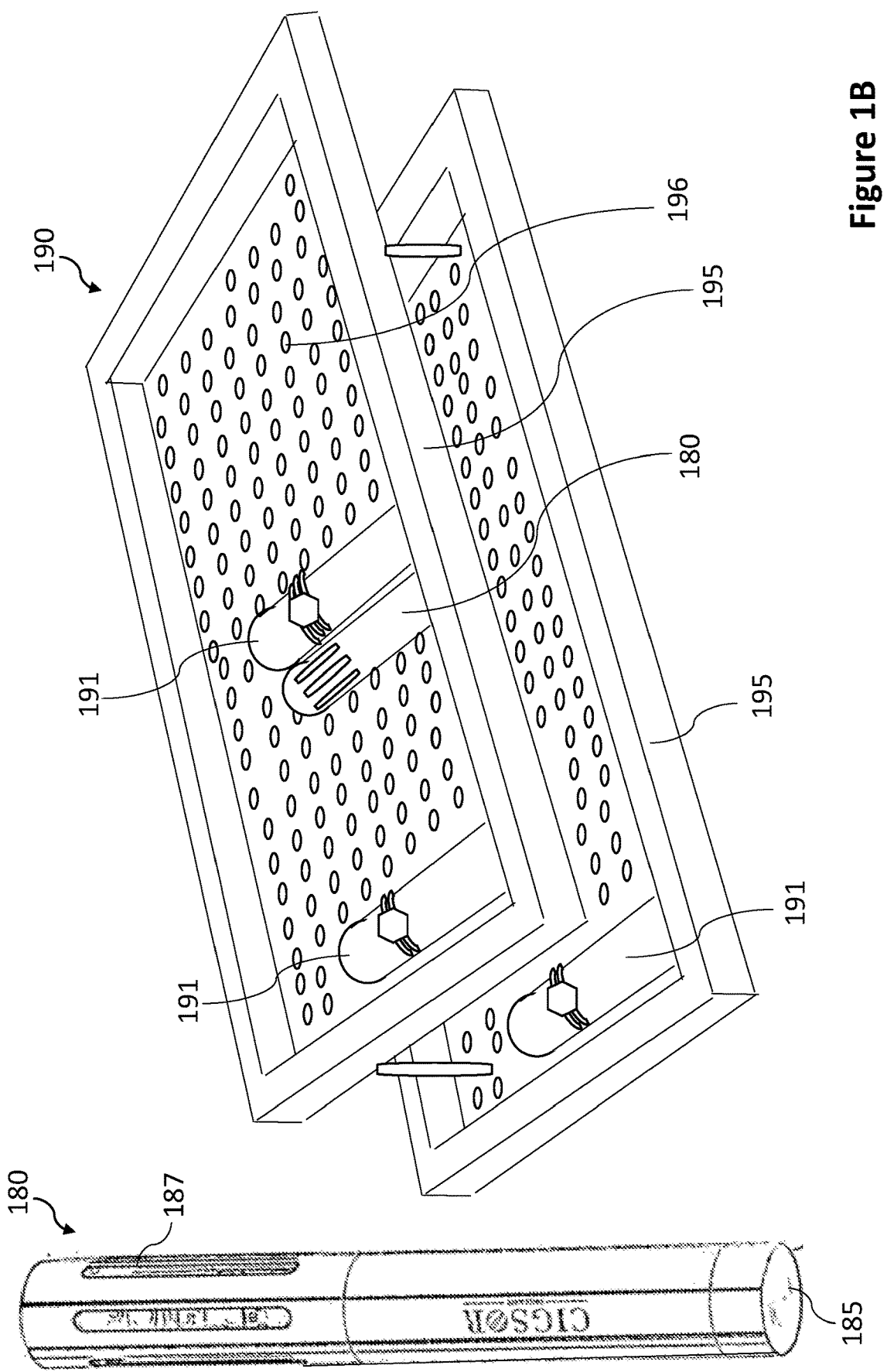
FIG. 1B shows the casing and preferred placement of the humidor monitoring system, according to an example embodiment.

FIG. 1B shows the casing and placement of the HSPS in a preferred embodiment. The present inventors have realized that the prior art solutions of measuring relative humidity in a cigar humidor are beset with a number of problems. An example of a prior art wireless sensor for relative humidity marketed for humidor use would be the iCelsius Wireless RH. That product and a host of similar products sold in the present marketplace suffer from the fact that major components are made from plastics, such as thermoplastics, of which polyethylene would be an example and thermosets, of which urea formaldehyde would be an example. The problem with plastics casings in a humidor setting is that plastics tend to produce fumes or smells, which can negatively affect the taste of a cigar. A humidor is a place that is designed to have very little circulation of air and even a small degree of fumes from plastics would have a detrimental effect on the taste and flavor of the cigars stored in the humidor. The present inventors have therefore determined that as an inventive departure, the casing of any components placed in the humidor itself needs to be manufactured out of a material which is either incapable of giving out smells or fumes, or alternatively it needs to be manufactured from a material commonly in use inside humidors, such as cedar wood. Embodiments of the present inventions have been made using stainless steel, cedar wood and anodized aluminum casings. A preferred embodiment of the invention uses cedar wood for the casing since it is desirable that all components of a humidor are made of cedar wood by industry convention. The present inventors have realized that this general principle ought to be extended to sensor casings placed inside a humidor. Another inventive departure by the present inventors was the shape of the casing. All known prior art products were general purpose humidity and/or temperature sensors with a casing that was not optimized specifically for use in a humidor. The present inventors have found that in order to get an optimum measurement quality the sensors need to be placed as close to the produce as is possible. Cigars in a humidor are ordinarily stored in stacks or racks which are placed in the humidor. Within a rack the cigars are placed in rows. Embodiments of the present invention have shaped the sensor casing essentially like a cigar. This shape has the advantage, that the sensors assembly can be placed adjacent to the cigars, or right in between the cigars, in virtually any humidor currently on the marketplace. FIG. 1B shows the shape and placement of the sensor assembly in a preferred embodiment. The sensors and the HSPS components 180 are housed in a cigar-shaped and cigar-sized casing made out of stainless steel 185 comprising slit-shaped vents 187 for optimal air circulation to the sensors inside the casing. The HSPS assembly 180 is then placed between the cigars 191 on a humidor rack 195. The humidor racks are typically arranged as stacks 190 in larger humidors. Moreover, the racks 195 tend to have holes 196 for better ventilation between racks.

Figure 2:
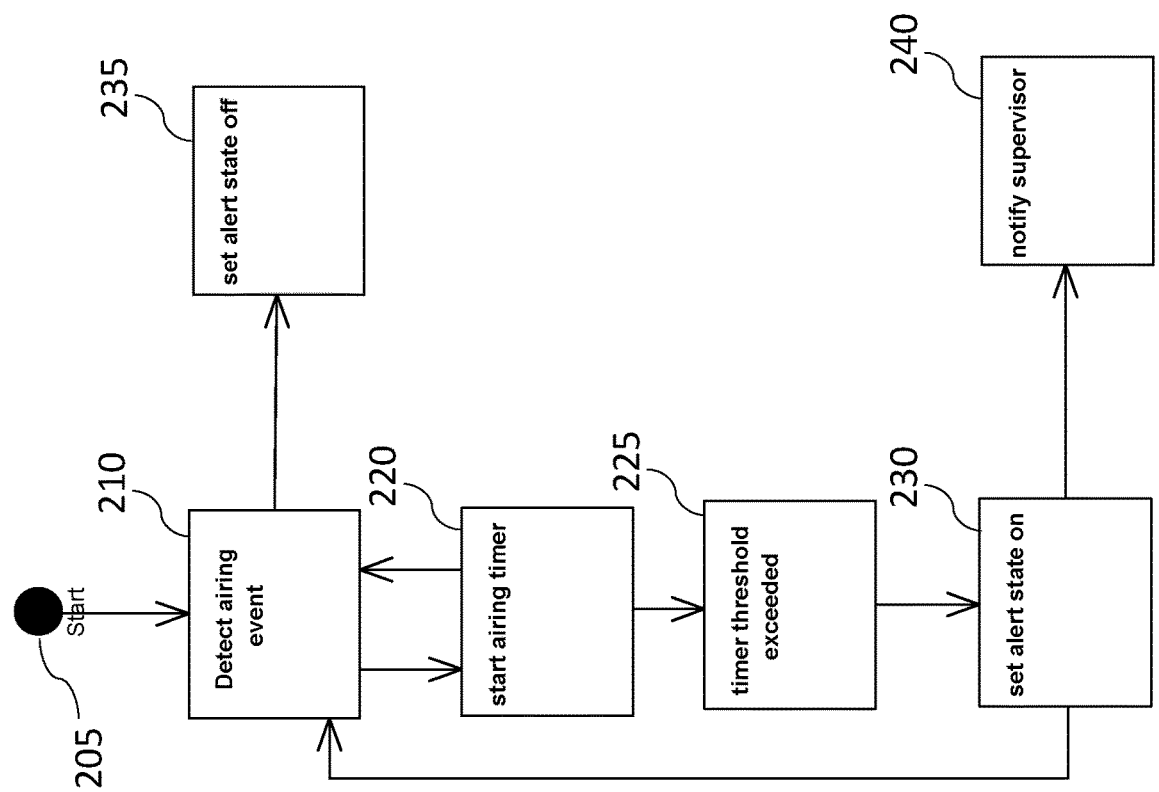
FIG. 2 shows a flow chart depicting the control flow starting from a detection event through to the issuance of an alert, according to an example embodiment.

FIG. 2 relates to a flow chart depicting the flow of events starting 205 from a detection of an airing event 210 and ending with the notification of a stakeholder 240. Whenever an airing event 210 is detected the airing timer is started 220 and at the same time any existing alert states are cancelled 235. It is important to point out in this context that any humidor can only have a single instance of an airing timer running at any given time. The consequence is that every time an airing event is detected and before an alert status has been reached the timer is being reset. If, however, the timer has reached a set threshold 225 without another airing event having reset the procedure, then an alert state 230 is being reached and a supervisor 240 is being notified. The alert state is left on until such time that the next airing event is being detected. In a preferred embodiment, there is a plurality of alert states, namely pre-alert and full alert. The airing timer in that case is configured to have two thresholds which will trigger an alert notification to a supervisor. In the case of a pre-alert, the supervisor is informed by the system that a full alert is imminent in case no corrective action is taken in time. Therefore shortly before the environmental condition which is being monitored reaches a danger level, the supervisor is informed on a precautionary basis. In the preferred embodiment of the cigar humidor setting, the supervisor is first informed that an airing out is required imminently. In case that no such airing out event is detected until the time to the second threshold has elapsed, the system proceeds to full alert status. Full alert status signifies that merchandise is in immediate danger of spoiling in case no immediate remediate action is taken. In a preferred embodiment the system also monitors the time which has elapsed since full alert status. That information helps a humidor supervisor to decide if the merchandise is still fit for sale at all and, if yes, if there needs to be a markdown in quality. For example a cigar humidor which has not been aired in several weeks may still hold cigars fit for human consumption, albeit such cigars may have to be marked down as no longer having premium quality status.

Figure 3:
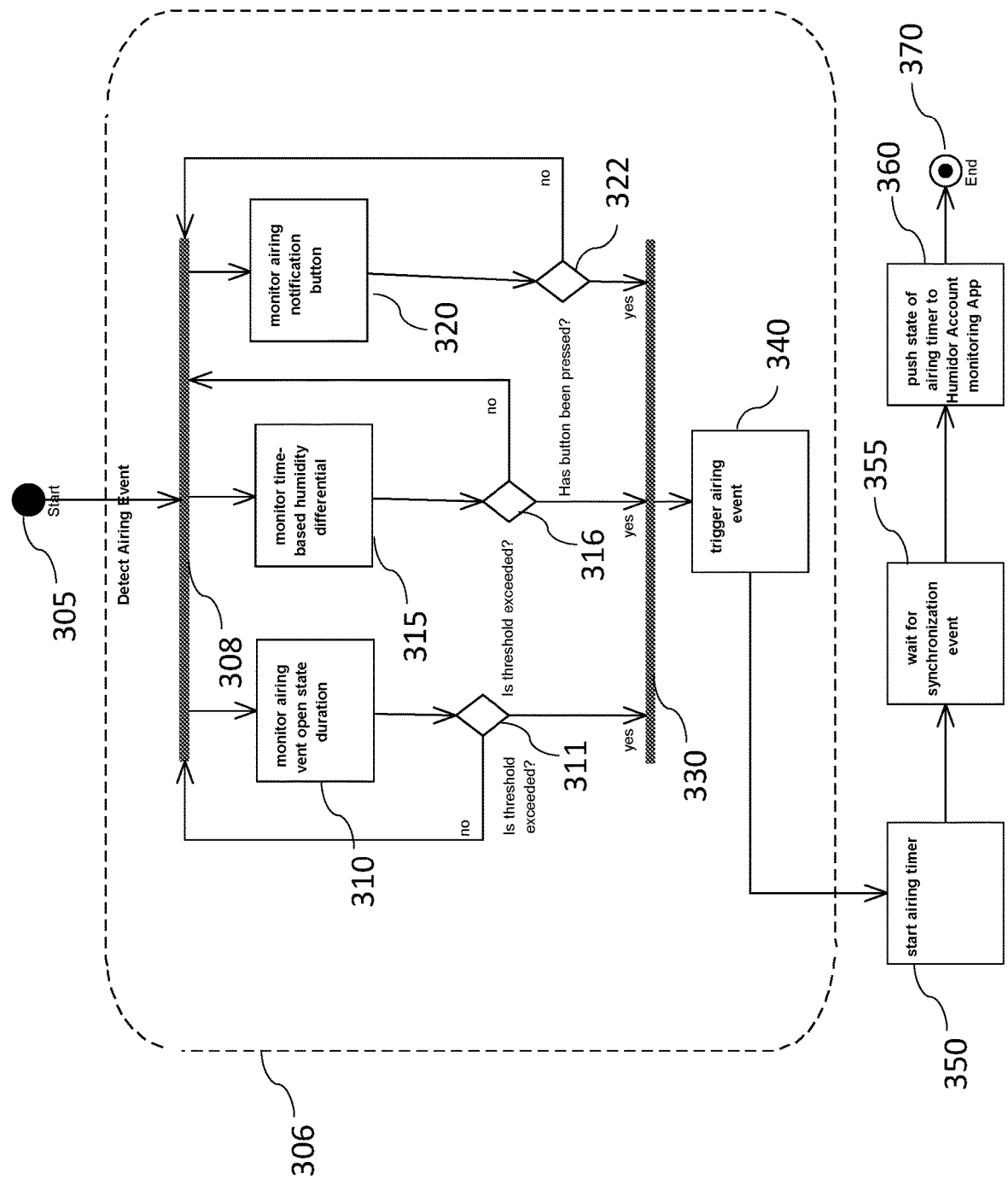
FIG. 3 is a flow chart depicting alternative ways of detecting an airing event, according to an example embodiment.

FIG. 3 is a flow chart presenting further detail with respect to detecting timing events in a preferred embodiment. In the depicted embodiment the flow starts 305 and begins with the detection of an airing event 306, which in turn is modelled as a sub-flow. In that sub-flow the control flow is at first multiplexed 308. Through multiplexing it is possible to utilize three different alternative detection methods in parallel. The multiplexer allows, as one of the alternatives, to monitor an airing vent for an "open" state. This can accomplished on a technical level with a door contact on a humidor, for example. If the vent has been open for a minimum prescribed time, then a threshold is reached. In decision step 311 that threshold is queried. If the threshold time for the vent being open has been breached, then an airing event 340 is being triggered. Another multiplexer alternative is to monitor for a time-based humidity differential 315. In other words, the system is looking for outliers in time-series data relating to humidity measurements. If such an outlier has been detected, then an airing event is being triggered 340. The last multiplexer alternative relates to manual notification, in other words, the humidor user presses a button, or uses some other suitable notification method, in order to inform the system that the humidor has been aired out successfully. Likewise to the other multiplexer alternatives, an airing event is being registered on a positive decision 322. Once an airing event has been detected, the airing timer is started 350. At this point in time the information regarding the airing event is still local to the HSPS. There are, however, regular synchronization events which initiate synchronization of HSPS data with HAMA data. The system waits for such a synchronization event 335 and then pushes the timer state outwards to the set of HAMAs, i.e. the plurality of humidor account monitoring apps.

Figure 4:
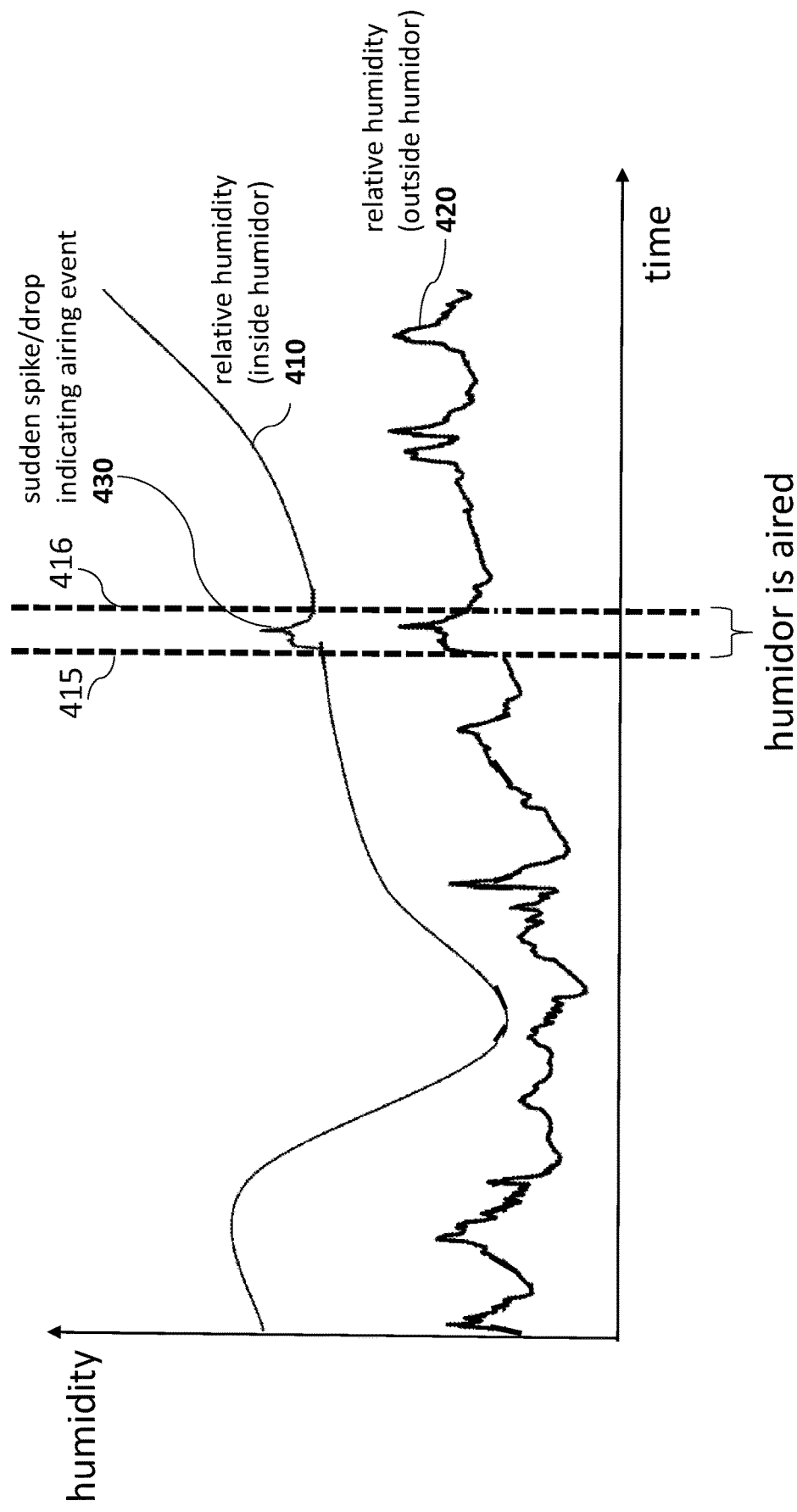
FIG. 4 is a graph depicting a time series of relative humidity data comprising an anomaly signifying an airing event, according to an example embodiment.
Figure 5:
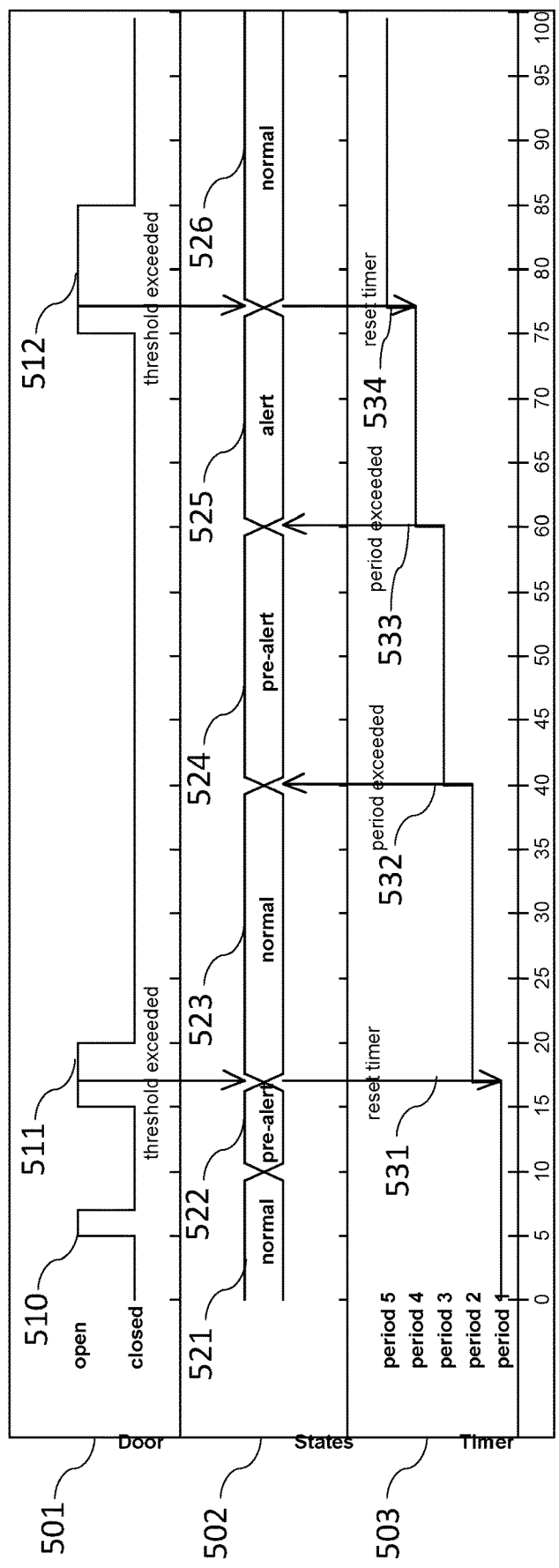
FIG. 5 is a timing diagram illustrating how alert states are changed depending on a threshold being exceeded on a door sensor, according to an example embodiment.

FIG. 4 details how automatic detection of an airing event is accomplished in a preferred embodiment. The figure depicts two graphs where relative humidity is charted against a time axis. The first graph 410 relates to the relative humidity inside a humidor, whereas the second graph 420 depicts the relative humidity of the air outside of the humidor, i.e. the room in which the humidor is situated. What comes to attention when comparing the curves 410 and 420 is that curve 410 is much smoother und uniform than curve 420. This is explained by the fact that there is only miniscule circulation of air inside of a humidor, whereas in the room housing the humidor, typically a shop on a high street, there is a considerable movement of air. Especially random exchange of room air with outside air causes considerable spikes and troughs in the corresponding graph 420. Generally in a shop setting, customers coming in through the shop entrance is a series of events causing random fluctuations in the curve 420. The inside of the humidor, on the other hand, is shielded against such random fluctuations by the lack of significant air exchange with the air outside of the humidor. This situation changes, however, as soon as a humidor is opened for any reason. As soon as the humidor door is open, the air inside the humidor is rapidly replaced by outside air with the same characteristics, including rapid fluctuations in relative humidity. On FIG. 4 such a period of free exchange of air is demarcated by lines 415 and 416. Line 415 signifies the humidor door having been opened and line 416 signifies the said door having been closed again. The preferred embodiment of the present invention uses mathematical methods relating to outlier detection in a time series in order to algorithmically being able to differentiate the periods in which free air exchange could take place. Once the period of free air exchange reaches a pre-configured threshold, then an airing event is deemed to have taken place and the system is automatically notified accordingly. FIG. 5 is a timing diagram which illustrates the concepts of how the "open" states of a humidor vent or door are being mapped to specific alert states. It has to be emphasized that detection of "open" states can be accomplished in a multitude of ways, most importantly door sensors and time-series analysis of relative humidity data. The timing diagram of FIG. 5 is subdivided into three lanes, depicting the door "open" state, the alert state and the timeline. Within the timeline there are three distinct periods, wherein the door was opened, namely periods 510, 511 and 512. At the beginning the alert state depicted in lane 502 was the "normal" state. Unless an airing event is being detected in the interim, the alert states are configured to progress from "normal" to "pre-alert" and "alert" at pre-determined intervals. In the depicted example a "normal" period has a duration of 22.5 time units until the state changes to "pre-alert", which has a duration of 20.0 time units in the example. After the "pre-alert" period has elapsed, the "alert" period follows. The "alert" period does not exhibit a maximum duration. The "alert" period lasts until either an airing event is being detected or alternatively, the alert status is manually reset by an operator. It should be pointed out also that the configured time periods for the "normal" and the "pre-alert" status are entirely flexible und subject only to the requirements and preferences of the individual humidor operator. In FIG. 5, the "open" period 510 does not result in a changed alert state due to the fact, that the door was not left open for long enough to been deemed an airing event. Therefore the "normal" state 521 is not affected by the brief opening of the humidor and after the set maximum time span for the "normal" state is exceeded, the "normal" state 521 changes to the "pre-alert" state 522. The "pre-alert" state 522, however is cut short by the "open" period 511. This is because at time 531, the airing threshold has been exceeded. In the depicted example the airing threshold is arbitrarily set to 2 time units. Hence whenever the humidor door has been in the "open" state for more than 2 time units, an airing event is triggered, which in turn resets the alert state to "normal". In the present example that airing event took place at time 531, thus resetting the alert status to "normal" 523. After another 22 time units without an airing event, the threshold for the escalation to "pre-alert" status has been reached at time 532. After another 20 time units have elapsed, at time 533, the "pre-alert" status 524 changes automatically to the "alert" status 525. The "alert" status continues for such time until the next airing event is being detected, which happens at time 534. Afterwards the alert status is reset back to "normal" 526.

Figure 6:
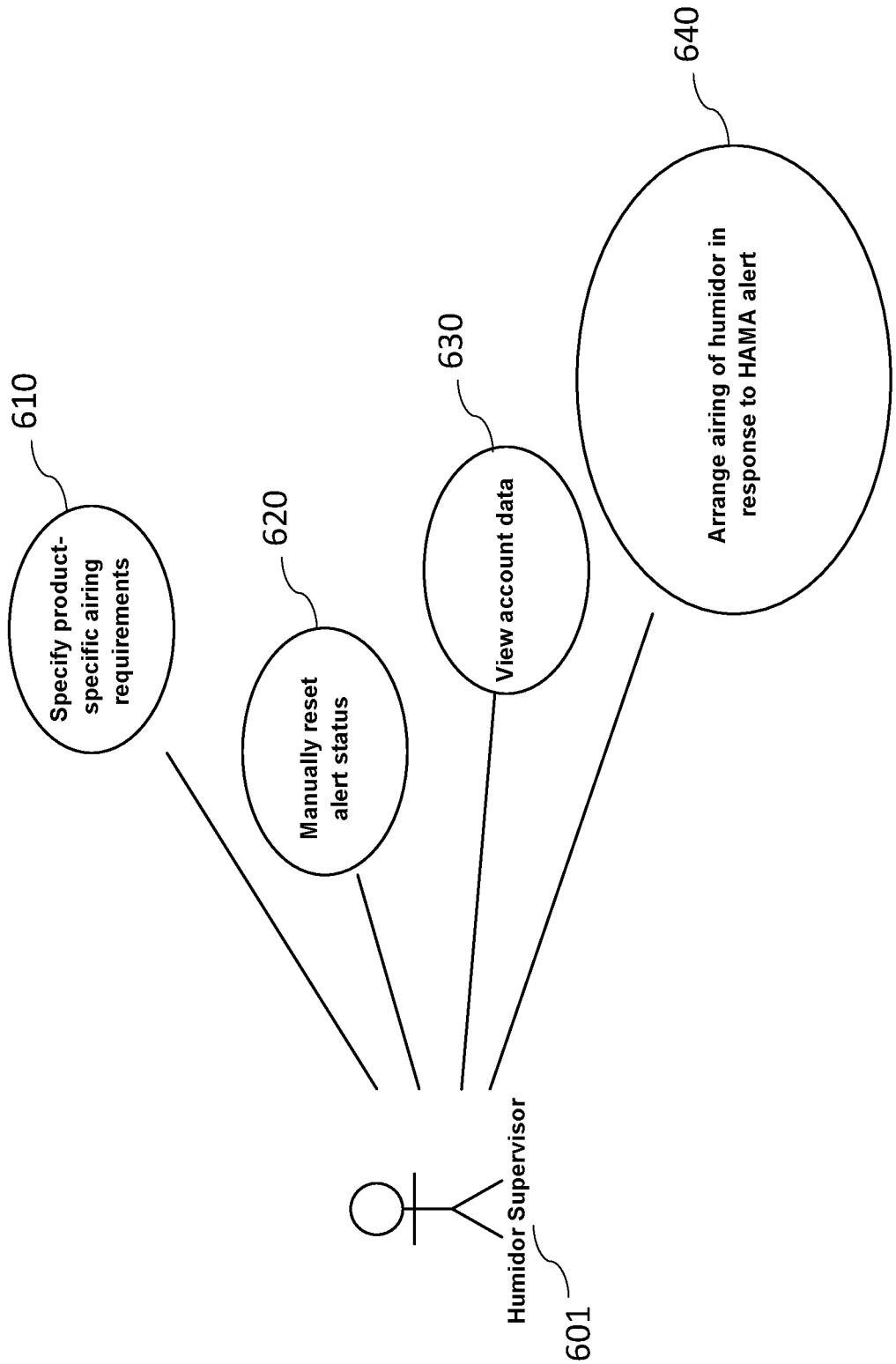
FIG. 6 is a use case diagram depicting the use cases associated with a humidor supervisor.

FIG. 6 is a use case diagram relating to use cases concerning a humidor supervisor 601. The humidor supervisor typically is a sales representative who is responsible for overseeing a plurality of humidors, each of which being associated to a plurality of customer accounts. The humidor supervisor could potentially also be a private cigar collector who merely wishes to monitor a plurality of humidors in a domestic setting. The humidor supervisor is responsible for specifying product specific airing requirements 610. Different types or brands of cigars tend to have different storage and airing requirements and it is the responsibility of the humidor supervisor to transpose these requirement into the system, whereby the HAMA smartphone app would normally be used to accomplish that goal. The humidor supervisor is also responsible for manually resetting the alert status 620, if required. Viewing the account data 630, is another of the use cases of the humidor supervisor. That use case involves accessing business intelligence data relating to the plurality of humidors through the HAMA app. The HAMA app also assists the humidor supervisor in this context by helping to prepare humidor maintenance and inspection schedules alongside the associated itineraries. Another use case that the humidor supervisor is involved in is arranging the airing of a humidor in response to an alert relayed via the HAMA app 640. In case a humidor has not been aired in the correct timeframe by a local humidor attendant, the humidor supervisor is alerted as part of an escalation procedure so that spoilage of valuable cigar stock can be avoided.

Figure 7:
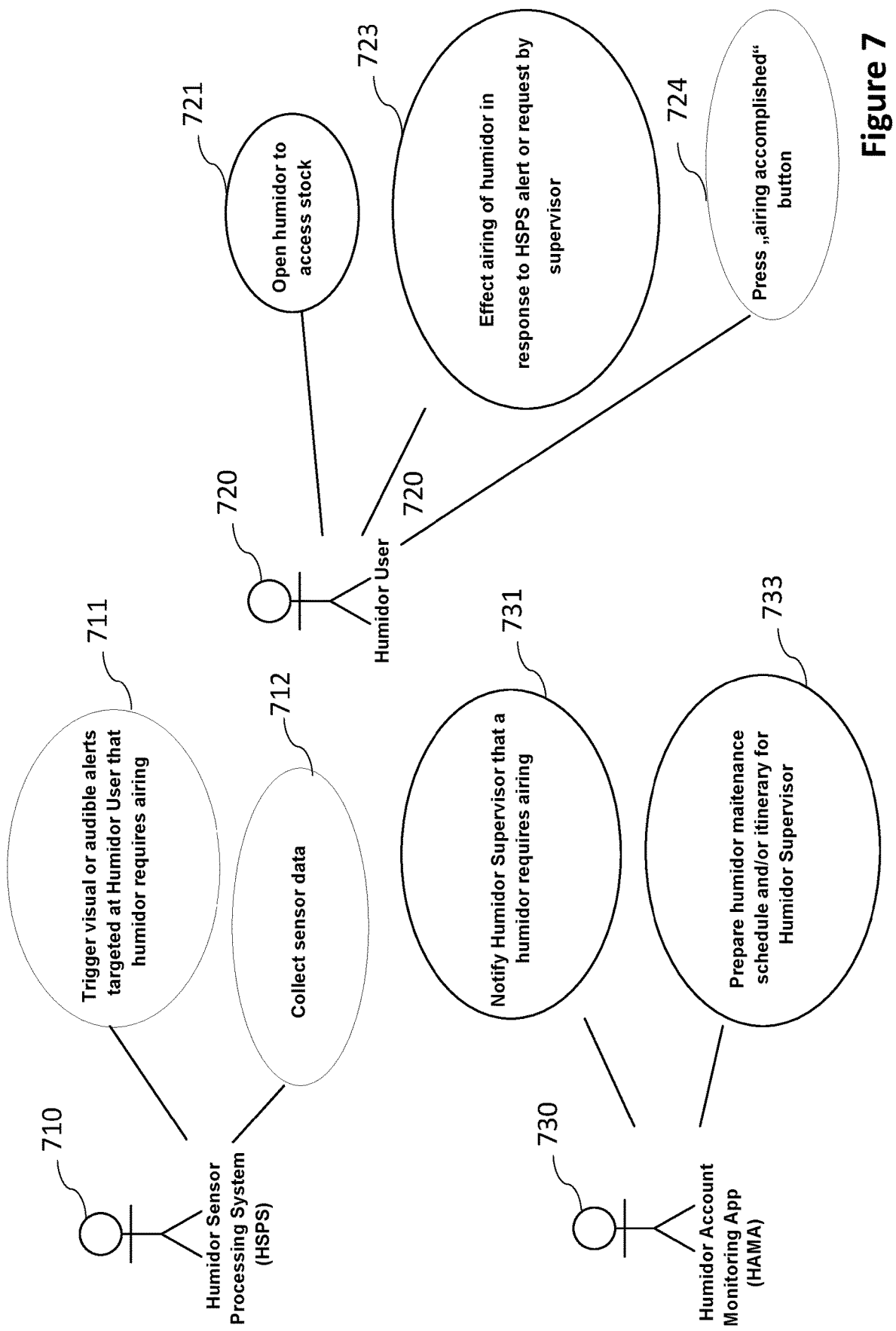
FIG. 7 is a use case diagram depicting the use cases associated with a Humidor Sensor Processing System, a Distributed Humidor Management System and a humidor user.

FIG. 7 is a use case diagram of relating, individually, to the Humidor Sensor Processing System (HSPS) 710, the Humidor Account Monitoring App (HAMA) 730 and the humidor user 720. The prime use case of the HSPS relates to collecting sensor data 712. Moreover it is a use case of the HSPS to display, or sound, alerts 711 targeted at a humidor attendant. The HAMA app in 9 turn serves two major use cases, one is to notify the humidor supervisor that a humidor requires airing 731, the other is to prepare a humidor maintenance schedule or a related itinerary 733. The humidor user (or shop attendant) 720 serves three major use cases: opening the humidor to access stock 721, effecting an airing out of the humidor in response to either an HSPS alert or an explicit request by the humidor supervisor 723, or to press an "airing accomplished" button whenever the humidor has been aired out successfully 724. The use cases introduced in FIGS. 6 and 7 are merely illustrative of the most important use cases in a preferred embodiment and as such are not intended to be limiting.

Figure 8:
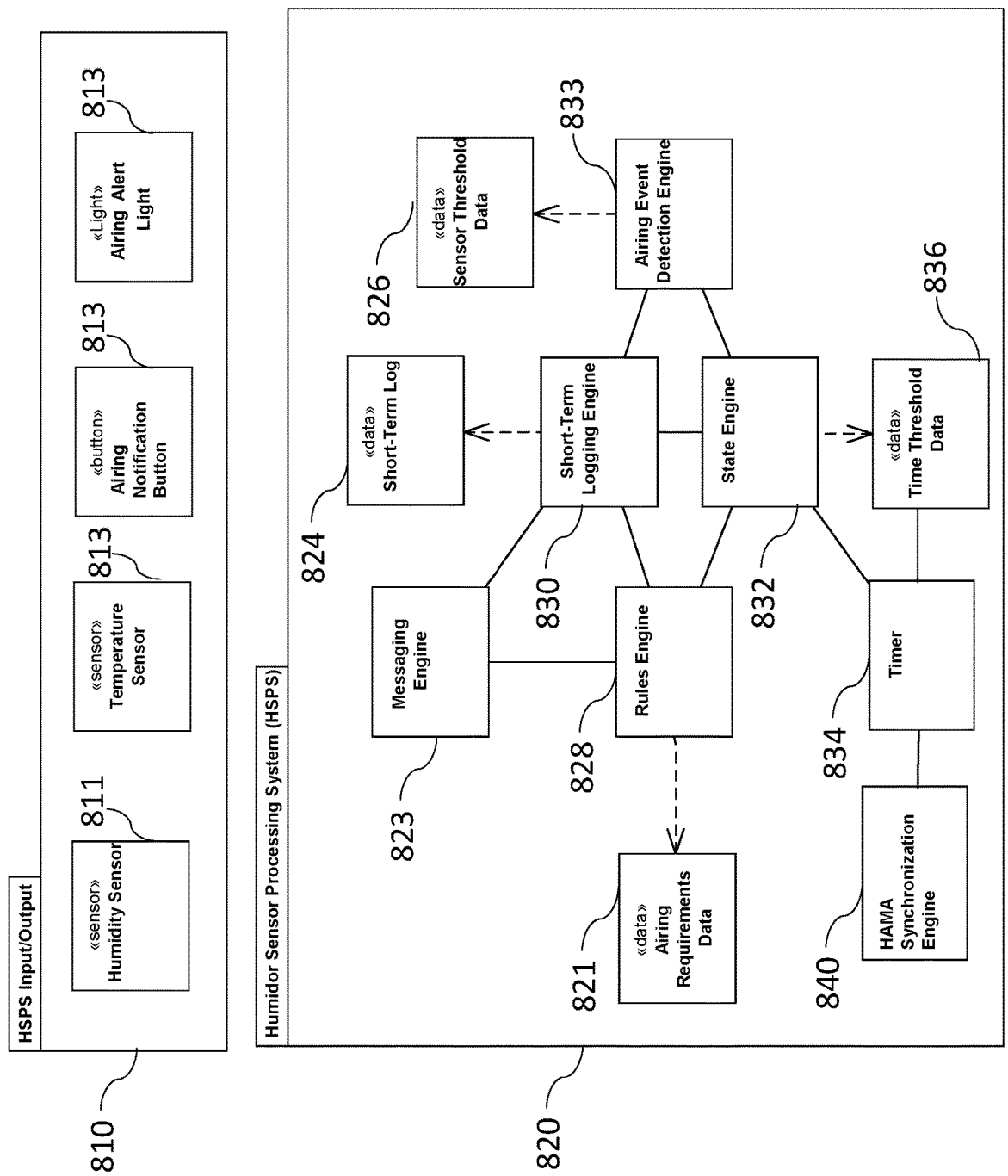
FIG. 8 is a component diagram illustrating the components comprised in the Humidor Sensors package and the Humidor Sensor Processing System package, according to an example embodiment.
Figure 9:
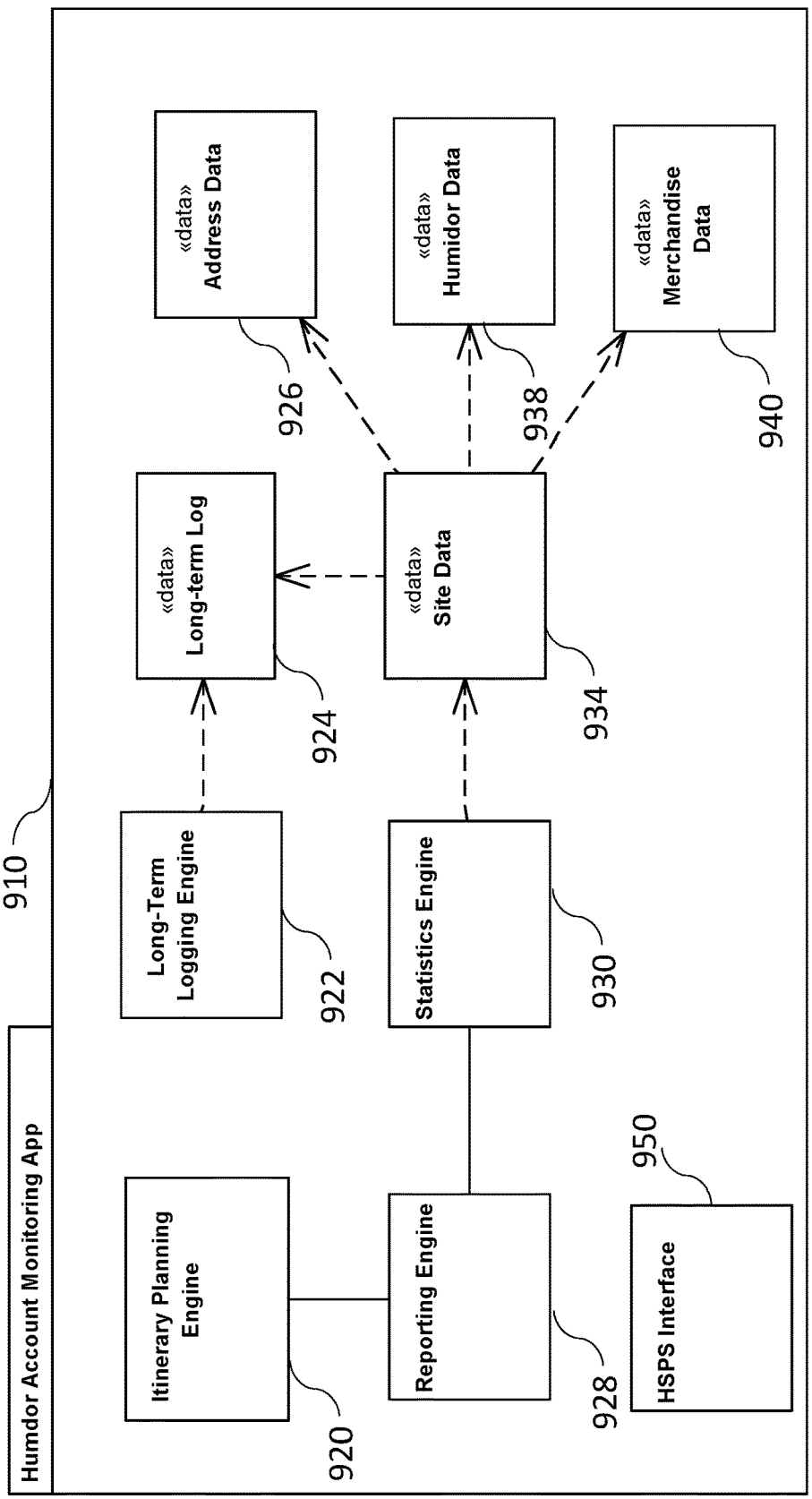
FIG. 9 is a component diagram illustrating the components comprised in the Distributed HSPS Management System package, according to an example embodiment.

FIGS. 8 and 9 are system diagrams depicting the major sub-components making up both the HSPS and the HAMA components. In FIG. 8 the HSPS is split up into its sub-components. The topmost box 810 depicts the input/output components which are comprised in a preferred embodiment of the present invention. Specifically these input/output components are comprised of: a humidity sensor 811, a temperature sensor 813, an airing notification button 813, and an airing alert light 813. Additional sensors and additional or alternative alert or notifications methods are also possible in other embodiments. The core HSPS system 820 comprises a state engine 832 which keeps track of both alert states and "door open" states. The state engine takes input from the time threshold data repository 836, which stores details on the time intervals which effect a change of state when exceeded. The state engine takes further input from the airing event detection engine 833, which notifies the state engine of airing events. The state engine also takes input from timer 834 which it uses to estimate the duration of both the "door open" state and the plurality alert states. Furthermore the state engine takes input from the rules engine 828 which translates airing requirements data 821 into instructions that may be interpreted by the state engine. The short term logging engine 830 is an event logger that logs all relevant events arising from the rules engine 828, the messaging engine 823, the state engine 832 and the airing event detection engine 833. These events are stored in the short term log 824. The short term log also stores all data produced by the HSPS input/output components 810. The short term log acts as a buffer for data that is waiting to be synchronized with the HAMA apps that serve as mediators for long-term storage. Synchronization with the HAMA app is accomplished by the HAMA synchronization engine 840 which comprises a web service interface allowing it to network with a plurality of HAMA instances.

FIG. 9 depicts the major components of the HAMA app 910. The HSPS interface 950 is responsible for establishing a communications link with the plurality of associated HSPS through a web service accessed over the Internet. The data which is buffered by the HSPS in the form of the short-term log data is pushed to the HAMA apps through the web service and subsequently becomes part of the HAMA long-term log. It has to be noted that the long-term data is not necessarily stored on the persistent memory of the smartphone-type device hosting the app, but that the HAMA app may make use of cloud services in order to delegate long-term data storage. It is the function of the long-term logging engine 922 to determine the most appropriate storage location for long-term data. The long-term logging engine will normally keep a cache of recent data on the persistent memory of the device hosting the HAMA app. Most of the long-term logging data will however be stored and archived in the cloud. The HAMA app also comprises data not available on HSPS, namely address data 926, humidor data 938 and merchandise data 940. The address data related to the various sites where HSPS-monitored humidors are installed. The humidor data relates to humidor-specific parameters, such as manufacturer, type, model and capacity. The merchandise data in turn relates to information concerning the merchandise stored in the humidors, such as cigar brands, best before date, batch numbers and airing requirements for particular brands. The statistics engine 930 extracts business intelligence from the data repository. Such business intelligence includes data on detected airing events. The business intelligence data is processed by the reporting engine 928 which translates raw data into a human readable format, such as a PDF document containing tables, graphs and charts. The reporting engine is connected to an itinerary planning engine 920, which takes into account impending airing requirements throughout the humidor network. Itineraries can be produced which allow a sales representative to visit stores where merchandise is at risk of spoilage due to lack of observance of airing requirements.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device. Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications

Herein below are a few definitions and clarifications. As used herein:

The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e. g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored

The invention claimed is:

1. A container adapted for storing at least one perishable item and alerting a user to a spoilage hazard related to the at least one perishable item, the container comprising:
    a read/write persistent memory, wherein the read/write persistent memory is adapted for storing a time threshold data repository and wherein the time threshold data repository is adapted in such a way that it comprises at least one type of an event and a plurality of associated time thresholds, and wherein the event relates to a change inside said a container environment and wherein the plurality of associated time thresholds comprises a pre-alert threshold and a full alert threshold;
    a repository of merchandise data, wherein the repository comprises at least one environmental requirement for a recommended storage of at least one generic item of merchandise;
    a timer, wherein the timer is started by the event being detected, and wherein the timer is capable of determining an elapsed time since being started and wherein the timer is capable of determining whether one of the plurality of associated time thresholds has been reached; and
    an account configuration interface, operative to set a preference for an alert conditional on one of the plurality of associated time thresholds being breached, wherein an alert comprises a pre-alert and a full alert, wherein a pre-alert is for informing a user of impending spoilage of the perishable item and wherein a full alert is for informing a user of materialized spoilage of the perishable item,
    wherein the alert preference is set in such a way that:
        the at least one environmental requirement is read from the repository of merchandise data,
        the full alert threshold is preset according to the at least one environmental requirement, and
        a user presented with the preset along with an option to override the preset.

2. The container of claim 1, wherein the container is a humidor for storing perishable goods in a humidity-controlled environment.

3. The humidor of claim 2, wherein the humidor is a cabinet for cigars.

4. The humidor of claim 2, wherein the humidor is a refrigerator and wherein the refrigerator comprises an auto defrosting function for controlling humidity.

5. The humidor of claim 2, wherein the humidor is a refrigerator of a type that comprises a dehumidifier for controlling humidity.

6. The humidor of claim 2, wherein the humidor is a combined refrigerator/freezer comprising an auto-defrost function for controlling humidity.

7. A container adapted for storing at least one perishable item and alerting a user to a spoilage hazard related to the at least one perishable item, the container comprising:
- a timer, wherein the timer is capable of determining a timestamp, wherein the timestamp signifies when an event is detected and wherein the event comprises an open state or a change inside an environment of the container and wherein the timer is capable of determining if a plurality of time thresholds have been reached, wherein the plurality of time thresholds are measured against elapsed time since the timestamp and wherein the plurality of time thresholds comprise a pre-alert threshold and a full alert threshold;
- a read/write persistent memory wherein the read/write persistent memory is adapted for storing a repository of merchandise data; and
- one or more smartphone-type or tablet-type computing devices,
- wherein the one or more smartphone-type or tablet-type computing devices comprise an account configuration interface, operative to:
  - determine a preset for the full alert threshold, wherein the preset is derived from one or more requirements for storing a generic item of merchandise in such a way that spoilage is avoided, and wherein the requirements comprise at least one time-dimensional requirement, and wherein the preset is an initial default value and wherein the requirements are sourced from the repository of merchandise data, and
  - presenting a user with the preset and offering an option for override.

8. The container of claim 7, wherein the container is a humidor for storing perishable goods in a humidity-controlled environment.

9. The humidor of claim 8, wherein the humidor is a cabinet for cigars.

10. The humidor of claim 8, wherein the humidor is a refrigerator and wherein the refrigerator comprises an auto defrosting function for controlling humidity.

11. The humidor of claim 8, wherein the humidor is a refrigerator of a type that comprises a dehumidifier for controlling humidity.

12. The humidor of claim 8, wherein the humidor is a combined refrigerator/freezer comprising an auto-defrost function for controlling humidity.

13. A container adapted for storing at least one perishable item and alerting a user to a spoilage hazard related to the at least one perishable item, the container comprising:
- a state engine for determining an alert state, wherein an alert state is dependent on when one or more thresholds being reached and wherein possible alert states comprise a pre-alert state and a full alert state, wherein a pre-alert state relates to an impending spoilage and a full alert state relates to a materialized spoilage and wherein the pre-alert state is associated with a pre-alert threshold and wherein the full alert state is associated with a full alert threshold;
- a timer for measuring elapsed time since an event, wherein an output of the timer holds information suitable for determining when the event has occurred and wherein the event comprises a change inside the container and wherein the timer is capable of determining if the pre-alert threshold and the full alert threshold have been reached;
- a persistent memory, wherein the persistent memory is adapted for storing a repository of merchandise data, wherein the merchandise data comprises a collection of one or more environmental requirements, wherein the one or more environmental requirements are each associated with a storage guideline for a generic item of merchandise and wherein an environmental requirement of the one or more environmental requirements comprises a best-before type time interval;
- an account configuration interface, operative to set an alert preference, wherein the alert preference is for overriding a preset of the full alert threshold, wherein the preset is derived from a time-dimensional parameter of the environmental requirement; and
- an alert engine for informing a user of the alert state.

14. The container of claim 13, wherein the container is a humidor for storing perishable goods in a humidity-controlled environment.

15. The humidor of claim 14, wherein the humidor is a cabinet for cigars.

16. The humidor of claim 14, wherein the humidor is a refrigerator and wherein the refrigerator comprises an auto defrosting function for controlling humidity.

17. The humidor of claim 14, wherein the humidor is a refrigerator of a type that comprises a dehumidifier for controlling humidity.

18. The humidor of claim 14, wherein the humidor is a combined refrigerator/freezer comprising an auto-defrost function for controlling humidity.

* * * * *